(12) United States Patent
Johnson

(10) Patent No.: US 10,277,520 B2
(45) Date of Patent: Apr. 30, 2019

(54) PACKET TRANSFER BUFFER FOR COMPUTER SYSTEM WITH MULTIPLE SOURCE AND DESTINATION INTERFACES

(71) Applicant: Southwest Research Institute, San Antonio, TX (US)

(72) Inventor: Mark A. Johnson, Spicewood, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 5 days.

(21) Appl. No.: 15/407,848

(22) Filed: Jan. 17, 2017

(65) Prior Publication Data

US 2018/0205663 A1    Jul. 19, 2018

(51) Int. Cl.
*H04L 12/863* (2013.01)
*H04L 12/879* (2013.01)

(52) U.S. Cl.
CPC ........ *H04L 47/6245* (2013.01); *H04L 49/901* (2013.01)

(58) Field of Classification Search
CPC .................. H04L 47/6245; H04L 49/901
See application file for complete search history.

(56) References Cited

U.S. PATENT DOCUMENTS

| 6,442,162 B1* | 8/2002 | O'Neill ................ H04L 47/10 370/389 |
| 2015/0016255 A1* | 1/2015 | Bisht .................... H04L 47/11 370/235 |

* cited by examiner

*Primary Examiner* — Yemane Mesfin
*Assistant Examiner* — Henry Baron
(74) *Attorney, Agent, or Firm* — Livingston Law Firm

(57) ABSTRACT

A packet transfer buffer for use in a computer system having multiple source and destination interfaces, as well as packet handling software. The buffer has a source packet FIFO and destination packet FIFO, each with an associated packet length counter. The packet handling software obtains packet lengths from the source packet counter, and provides the packet length to the destination packet counter. The buffer has hardware circuitry that handles transfer of data from the source packet FIFO to the destination packet FIFO without the need for word-by-word reads and writes by the packet handling software.

1 Claim, 2 Drawing Sheets

PACKET TRANSFER BUFFER FOR COMPUTER SYSTEM WITH MULTIPLE SOURCE AND DESTINATION INTERFACES

GOVERNMENT SUPPORT CLAUSE

This invention was made with United States Government Support under Prime Contract No. NNJ11HB15C, funded by the National Aeronautics and Space Administration (NASA). The Government has certain rights in this invention.

TECHNICAL FIELD OF THE INVENTION

The present invention relates to computer systems and, more particularly, to packet-data FIFO buffers used internally in computers having multiple source and destination interfaces.

BACKGROUND OF THE INVENTION

Today's Internet relies on packet transfers to communicate data. For example, downloaded Web pages arrive as a series of packets, and e-mails are transferred as packets. Networks that transfer data in packets are called packet-switched networks.

"Packets" are serial strings of bits that can vary widely in size. Packets carry their data in a protocol used by the particular network. For example, the Internet uses the Transmission Control Protocol/Internet Protocol (TCP/IP).

In general, each packet has a header, a payload, and a trailer. The header contains information that will help it get to its destination, such as the sender's IP address, the intended receiver's IP address. The payload is the actual data that the packet is delivering to the destination. The trailer, sometimes called the footer, typically contains data to tell the receiving device that it has reached the end of the packet. It may also have some type of error checking data.

Data transfers between data processing devices and peripherals are facilitated with data buffers, which help provide the desired immediacy to external bus communications. Data to be transmitted from a source device can be stored in a buffer so that it is ready for transmission to the destination device. Typically, data buffers use first-in-first-out (FIFO) buffers, which preserve the order of the data. A single device can have many FIFOs for both send and receive functions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

SPECIFICATION

The following description is directed to a packet data transfer buffer for transferring packets in a computing system having multiple source and destination packet interfaces. The data buffer is a hardware implementation that offloads tasks from conventional packet handling software. The data buffer uses source and destination FIFO memory units (referred to herein as "FIFOs"), as do conventional packet transfer systems. However, the data buffer also comprises a special indexed packet array and packet length counters.

In the past, the standard protocol for packet transfer buffers has been that received packets from one interface are stored into a source packet FIFO. The packet handling software then word-by-word moves a packet to the destination interface's destination packet FIFO, and then commands that memory stack to be transmitted out onto the destination interface.

This word-by-word move by the packet handling software is time consuming. The software is required to move all words in the packet from the source packet FIFO to the destination packet FIFO. This requires the software to perform a repetition of the following sequence of steps: 1) a word read of the source packet FIFO, 2) a word write to the destination packet FIFO, and 3) a counter increment and compare to see if the whole packet has been transferred. This requires many I-Fetches and execution cycles. For most packet handling processors, each pass through this set of steps requires somewhere on the order of 25 clock cycles per word.

Figure 1:
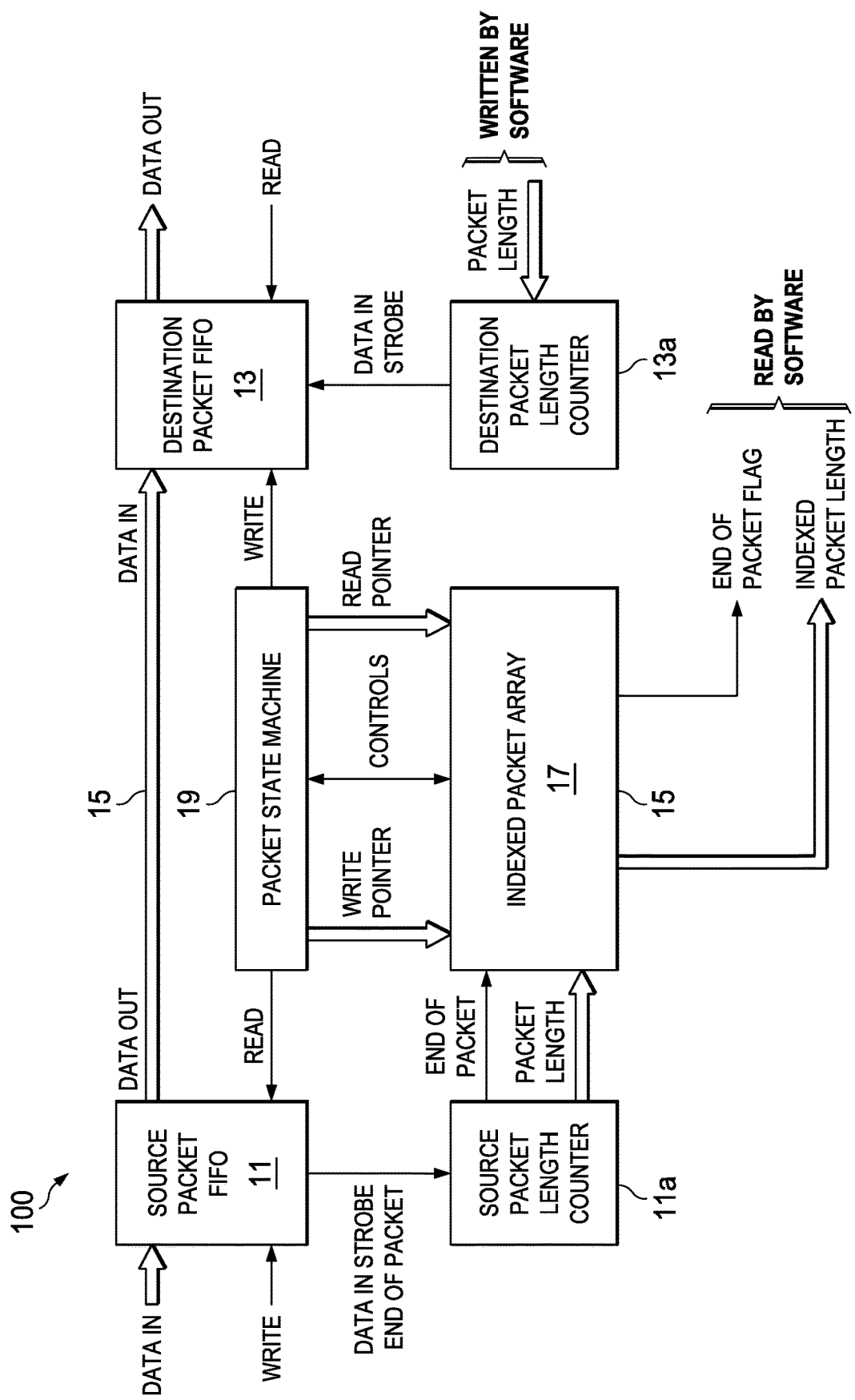
FIG. 1 illustrates a packet transfer buffer in accordance with the invention.

FIG. 1 illustrates a packet transfer data buffer 100 in accordance with the invention. As stated above, data buffer 100 is installed in a computing system having multiple source and destination interfaces. Data must be transferred within the system among these interfaces, for processing or other action.

It is assumed that the computing system is equipped with packet handling software. This software is modified as described herein, such that it reads and writes certain data from data buffer 100, which limits its role in transferring packet data within data buffer 100.

As in conventional packet transfer data buffers, data buffer 100 has a source packet FIFO 11 and a destination packet FIFO 13. Data is transferred into the source data FIFO, out of the source data FIFO, into the destination packet FIFO 13, and out of the destination packet FIFO 13 as described herein.

Each FIFO 11 and 13 comprises conventional data storage and control logic. The FIFO data storage may be static random access memory (SRAM) or any other suitable form of data storage. For FIFOs of non-trivial size, a dual-port SRAM is usually used, where one port is dedicated to writing and the other to reading. Control signals relevant to the invention are shown; FIFO may have various other control signals such as pointers.

FIFOs 11 and 13 are written to and read from via data bus 15. Write and read events are triggered with write and read signals, as indicated in FIG. 1.

Each FIFO 11 and 13 has an associated packet length counter 11a and 13a, respectively. Counters 11a and 13a can be implemented easily using register-type circuits such as the flip-flop.

Counter 11a receives a data-in strobe end of packet signals from FIFO 11. Using this information, counter 11a generates an end of packet signal and a packet length count.

Counter 13a receives a packet length count from the packet transfer software. It generates a data in strobe.

Data buffer 100 further comprises a smaller companion array to the source packet FIFO 11, which is referred to herein as an indexed packet array 17. The size of the indexed packet array 17 is calculated by dividing the size of the source packet FIFO 11 by the average size of a packet. These fields are filled by input from counter 11a.

The indexed packet array 17 has at least two fields. The first field is the length of the most recently received packet. The second field is an End of Packet Flag bit that indicates that a new packet has been received.

As described below, indexed packet array 17 receives read pointers and write pointers from a packet state machine 19. It also receives the end of packet signal and the packet length data from counter 11a A packet state machine 19 determines a packet state, and delivers read signals to the source packet FIFO 11 and write signals to the destination packet FIFO 13. It also delivers a write pointer and read pointer to the indexed packet array 17. The states determined by state machine 19 are described below, and result in controls to the indexed packet array 17. State machine 19 may be implemented with hardware, using known registers and logic devices.

The above-described elements of data buffer 100 may be implemented as separate integrated circuits, or incorporated as a larger integrated circuit.

In operation, as each packet is received via data bus 15, packet words are stored into the source packet FIFO 11. When the last word of a packet is received, as indicated by an end of packet bit, the length of that packet is known by counter 11a.

The packet length is stored into the current entry of the indexed packet array 17, and that entry's end of packet flag bit is set to one. The packet state machine 19 increments the write pointer of the indexed packet array 17 to point to the next unused entry.

The packet handling software periodically reads the indexed packet array 15 to determine if there is a new packet in the source packet FIFO 11.

The packet state machine 19 responds to the end of packet flag bit. If the end of packet flag bit is a one, the Packet State Machine 19 resets the end of packet flag bit and increments the read pointer of the indexed packet array 17. At this time, the packet handling software writes the length value it has read from the indexed packet array 17 to the destination packet length counter 13a. This completes the packet handling software's involvement in the packet transfer.

The packet state machine 19 further controls read signals to the source packet FIFO 11 and write signals to the destination packet FIFO. The current packet is transferred from the source packet FIFO 11 to the destination packet FIFO 13 at a rate of one word per clock cycle. This in turn, triggers the transmission of the packet out onto the destination interface.

With the above described buffer 100, the packet handling software need only be provided an end of packet flag and a packet length. Once it provides a packet length to counter 13a, the packet transfer from FIFO 11 to FIFO 13 are handled by buffer 100. The process described herein reduces the software bandwidth by an estimated 85% as compared to conventional packet handling software.

Figure 2:
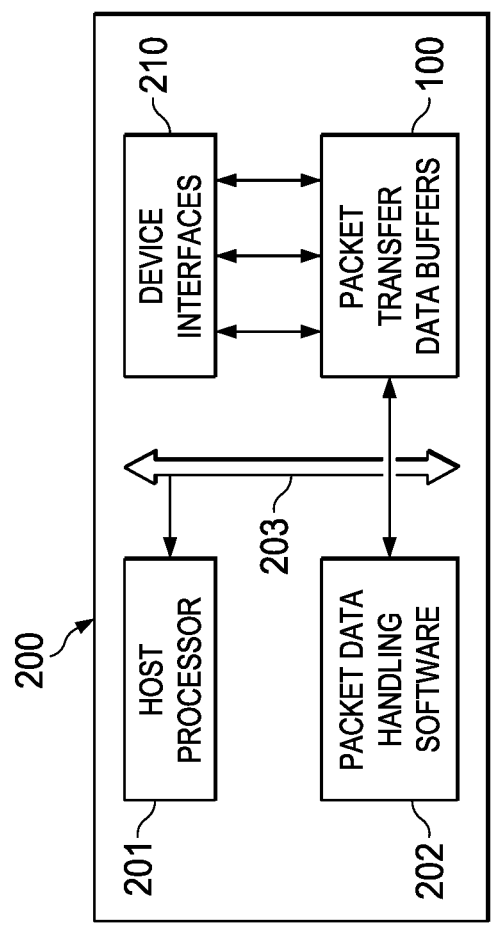
FIG. 2 illustrates an implementation of the packet transfer buffer in a computer system.

FIG. 2 illustrates an implementation of data buffers 100 in accordance with the invention. Data buffer 100 is implemented in a computer system 200. Computer system 200 has a host processor, and although not shown, has memory, operating system and other software and hardware of a conventional computer system.

Computer system 200 further has multiple I/O interfaces 210, such as for printers, disk drives, networks, and the like. Such a system is referred to herein as having multiple I/O (input/output) channels, and a data buffer 100 may be used for each channel. The device interfaces 210 communicate with host processor via an internal bus 203.

As described above, the software of computer system 200 includes packet handling software 202, which communicates with the packet transfer buffer(s) 100 in the manner described above.

What is claimed is:

1. A packet transfer buffer for buffering packet data transfers between a source device and a destination device of a computing system, the computing system having packet handling software, the buffer comprising:
    a source packet FIFO (first-in first-out) buffer;
    a source packet length counter;
    wherein the source packet FIFO is configured to deliver end of packet bit signals to the source packet length counter;
    wherein the source packet length counter is configured to count packet lengths and to output the end of packet bit signals and packet length values;
    a destination packet FIFO;
    a destination packet length counter, configured to receive the packet length values from the packet handling software and to generate destination data-in strobe signals;
    a data bus for directly communicating packet data into the source packet FIFO, from the source packet FIFO to the destination packet FIFO, and out of the destination packet FIFO;
    an indexed packet array configured to receive the end of packet bit signals and packet length values from the source packet length counter, and to output an end of packet flag signal and the packet length values;
    a state machine configured to respond to the end of packet bit signals, to increment a read pointer and a write pointer to the indexed packet array, and to control read signals to the source packet FIFO and write signals to the destination packet FIFO;
    wherein the packet transfer buffer is implemented solely with hardware devices, and has external communication only with the packet handling software and only by receiving the end of packet flag bit signals and indexed packet length values from the indexed packet array for delivery to the packet handling software and by receiving packet length values from the packet handling software for delivery to the destination packet length counter.

* * * * *